(12) United States Patent
Katayama et al.

(10) Patent No.: US 9,787,231 B2
(45) Date of Patent: Oct. 10, 2017

(54) MOTOR DRIVING DEVICE AND CONTROL METHOD OF MOTOR DRIVING DEVICE

(71) Applicant: MINEBEA CO., LTD., Kitasaku-gun, Nagano (JP)

(72) Inventors: Keiichi Katayama, Yonago (JP); Tomohiro Inoue, Yonago (JP); Shuhei Nishi, Yonago (JP)

(73) Assignee: Minebea Co., Ltd., Nagano (JP)

( * ) Notice: Subject to any disclaimer, the term of this patent is extended or adjusted under 35 U.S.C. 154(b) by 17 days.

(21) Appl. No.: 14/507,896

(22) Filed: Oct. 7, 2014

(65) Prior Publication Data
US 2015/0097510 A1  Apr. 9, 2015

(30) Foreign Application Priority Data

Oct. 8, 2013 (JP) .................................. 2013-211306

(51) Int. Cl.
    H02P 8/12 (2006.01)
    H02P 6/24 (2006.01)
    H02P 1/52 (2006.01)
(52) U.S. Cl.
    CPC ...................................... H02P 6/24 (2013.01)
(58) Field of Classification Search
    CPC ............... H02P 6/10; H02P 6/16; H01L 29/36
    See application file for complete search history.

(56) References Cited

U.S. PATENT DOCUMENTS

| 6,512,723 | B2 * | 1/2003 | Kobayashi | G11B 19/22 369/235 |
| 6,831,432 | B2 * | 12/2004 | Murakami | H02P 6/24 318/362 |
| 6,922,032 | B2 * | 7/2005 | Maeda | H02P 6/182 318/286 |
| 7,073,872 | B2 * | 7/2006 | Tagome | G11B 19/26 303/3 |
| 7,164,254 | B2 * | 1/2007 | Kerkman | H02M 1/44 318/727 |
| 2006/0044664 | A1 * | 3/2006 | Itagaki | G11B 19/28 360/73.03 |
| 2010/0052587 | A1 * | 3/2010 | Bonvin | G11B 19/20 318/400.32 |

FOREIGN PATENT DOCUMENTS

JP      07-184399 A      7/1995

* cited by examiner

*Primary Examiner* — Paul Ip
*Assistant Examiner* — Charles S Laughlin
(74) *Attorney, Agent, or Firm* — Carrier Blackman & Associates, P.C.; William D. Blackman; Jingli Wang

(57) ABSTRACT

A motor driving device includes a control unit which outputs a pre-driving signal to control a motor based on command information of an input target number of rotations and detection information of a number of rotations of the motor, and a motor driving unit which drives the motor based on the pre-driving signal. The control unit includes a speed control circuit which outputs speed command information based on the command information of the target number of rotations and the detection information, a stop control circuit which when an input of the command information of the target number of rotations is stopped, outputs stop command information after a predetermined time elapses from detection of stop of the motor, and a driving signal generation circuit which generates a control signal based on the stop command information and the speed command information.

5 Claims, 6 Drawing Sheets

*FIG. 3*

| SETTING INFORMATION SEL | STOP CONTROL MODE |
|---|---|
| 0 | DISABLED |
| 1 | ENABLED |

MOTOR DRIVING DEVICE AND CONTROL METHOD OF MOTOR DRIVING DEVICE

CROSS-REFERENCE TO RELATED APPLICATION

This application claims priority from Japanese Patent Application No, 2013-211306, filed on Oct. 8, 2013, the entire subject matter of which is incorporated herein by reference.

BACKGROUND OF THE INVENTION

1. Field of the Invention

The present invention relates to a motor driving device and a control method of the motor driving device, and more particularly, to a motor driving device configured to control driving of a motor based on command information of a target number of rotations and detection information of a number of rotations of the motor, and a control method of the motor driving device.

2. Description of the Related Art

As a method of controlling a rotating speed of a motor (for example, a brushless DC motor used as a fan motor or an electric fan motor) by a motor driving device, there has been used a control method in which a command signal is input from an outside, and a rotating speed of the motor is controlled according to the command signal. For example, as the command signal, a clock signal may be used. When the clock signal is used as the command signal, the clock signal and a signal indicating the number of rotations of the motor are compared to control a speed command value of the motor such that the clock signal and the signal indicating the number of rotations become same. Thereby, the rotating speed of the motor is controlled.

In this motor driving device, when the clock signal is stopped, the motor is stopped by a free run stop method in which all phases are turned off in response to the stop of the clock signal. However, according to this stop method, regenerative current flows while the motor is being rotated by its inertia, so that a noise (abnormal noise) is generated.

FIG. 6 shows an example of a control operation of a related-art motor driving device.

FIG. 6 shows changes of a clock signal Sc, a signal Sr indicating the number of rotations of a motor and an operating mode of the motor driving device when the motor is stopped by the free run stop method. Here, a case is exemplified in which the clock signal Sc is changed to 500 Hz, 1000 Hz and stop (0 Hz) over time.

That is, while the motor is being driven (driving mode) at a driving state where the signal Sr indicating the number of rotations is 500 Hz, when the clock signal Sc is changed from 500 Hz to 1000 Hz at a time t11, the control of accelerating the motor is performed, so that the signal Sr indicating the number of rotations is changed to 1000 Hz. When the clock signal Sc is stopped at a time t12, the operating mode is shifted to a deceleration mode and the motor starts to decelerate. At a time t13, switch elements corresponding to all phases of a motor driving unit become off, the operating mode is shifted to a stop mode and the motor is decelerated by a stop method of inertia rotation (the free run stop method). At a time t14, the rotation of the motor is stopped.

Here, in this free run stop method, the regenerative current flows from the time t13 to the time t14 (a time period of the inertia rotation), and an abnormal noise (for example, a clicking noise) may be generated.

In relation to this problem. JP-A-H7-184399 discloses a motor driving device configured to prevent generation of a noise due to a rapid stop of rotation. The motor driving device detects an operation stop based on a drop of a supply voltage to a driving circuit when an operating switch is turned off, and forcibly turns off all switch elements of the driving circuit based on the detection.

However, in the motor driving device of JP-A-H7-184399, a following problem occurs. That is, in this device, in order to suppress generation of noises, the voltage drop is detected when the power supply is turned off, so that the operation stop is detected. Therefore, when the power supply is on, even though the operation stop (the driving stop: stop of the clock signal) is detected, the device cannot cope with this situation. Also, this motor driving device is not configured to detect a signal indicating an actual driving state of the motor to thus detect the operation stop, but is configured to detect the operation stop based on the voltage drop, which is an indirect stop condition. Therefore, the accuracy of detecting the operation stop is low. For example, even when the voltage drop is detected and the operation stop is thus detected, there is a possibility that the motor is being rotated by its inertia.

SUMMARY

The present invention has been made in view of the above circumstances, and it is an object of the present invention to provide a motor driving device capable of surely stopping rotation of a motor in silence and a control method of the motor driving device.

According to an illustrative embodiment of the present invention, there is provided a motor driving device comprising: a control unit configured to output a pre-driving signal based on command information of an input target number of rotations and detection information of a number of rotations of the motor; and a motor driving unit configured to output a driving signal to the motor to drive the motor based on the pre-driving signal output from the control unit. The control unit includes: a speed control circuit configured to output speed command information on the number of rotations of the motor based on the command information of the target number of rotations and the detection information of the number of rotations; a stop control circuit configured, when an input of the command information of the target number of rotations to the control unit is stopped, to output stop command information after a predetermined time elapses from detection of stop of the motor, based on input stop information indicating that the input of the command information of the target number of rotations to the control unit is stopped and a detection result of the stop of the motor based on the detection information of the number of rotations; and a driving signal generation circuit configured, when the stop command information is output from the stop control circuit, to generate a control signal based on the stop command information and the speed command information output from the speed control circuit.

In the above motor driving device, the stop control circuit may include: a stop detection circuit configured to detect the stop of the motor based on the detection information of the number of rotations and output stop detection information; and a delay circuit configured to add the predetermined time to a timing, at which the stop of the motor is detected, to output delay information, based on the stop detection information output from the stop detection circuit.

In the above motor driving device, the stop control circuit may further include a selection circuit configured to output the stop command information to the driving signal generation circuit based on the input stop information and the delay information output from the delay circuit, in accordance with setting information on an output of the driving stop command information.

In the above motor driving device, the control unit may further include a storage configured to store therein setting information, and the selection circuit is configured to select whether to output the stop command information based on the setting information stored in the storage.

In the above motor driving device, a part or all of the motor driving device may be packaged as an integrated circuit device.

According to another illustrative embodiment of the present invention, there is provided a control method of a motor driving device including: a control unit configured to output a pre-driving signal based on command information of an input target number of rotations and detection information of a number of rotations of the motor; and a motor driving unit configured to output a driving signal to the motor to drive the motor based on the pre-driving signal output from the control unit. The control method comprises: outputting speed command information on the number of rotations of the motor based on the command information of the target number of rotations and the detection information of the number of rotations; when an input of the command information of the target number of rotations to the control unit is stopped, outputting stop command information after a predetermined time elapses from detection of stop of the motor, based on input stop information indicating that the input of the command information of the target number of rotations to the control unit is stopped and a detection result of the stop of the motor based on the detection information of the number of rotations; and when the stop command information is output from the stop control circuit, generating a control signal based on the stop command information and the speed command information output from the speed control circuit.

According to the above configuration, when the input of the command information to the control unit is stopped, the stop control circuit can output the stop command information after the predetermined time elapses from detection of stop of the motor, based on the input stop information indicating the input stop and the detection result of the stop of the motor. Therefore, it is possible to provide the motor driving device capable of surely stopping the rotation of the motor in silence and the control method of the motor driving-device.

BRIEF DESCRIPTION OF THE DRAWINGS

In the accompanying drawings:

FIG. 3 shows a relation between setting information and a stop control mode;

DETAILED DESCRIPTION

Hereinafter, a motor driving device according to an illustrative embodiment of the present invention will be described.

Illustrative Embodiment

Figure 1:
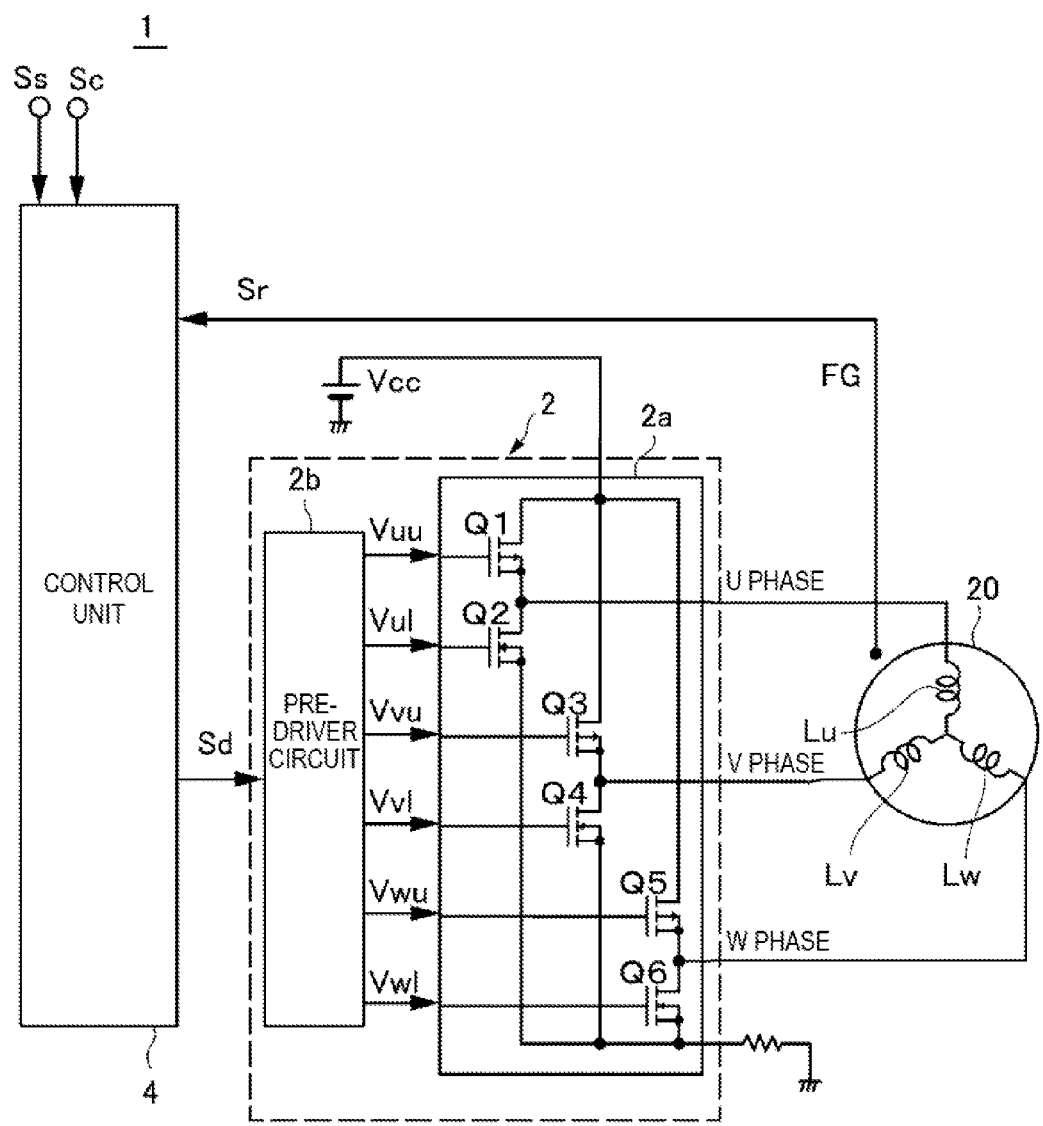
FIG. 1 is a block diagram showing a circuit configuration of a motor driving device according to an illustrative embodiment of the present invention.

FIG. 1 is a block diagram showing a circuit configuration of a motor driving device according to an illustrative embodiment of the present invention.

As shown in FIG. 1, a motor driving device 1 is configured to drive a motor 20 by, for example, a sine wave. In this illustrative embodiment, the motor 20 is a three-phase brushless motor, for example. The motor driving device 1 rotates the motor 20 by supplying it sinusoidal driving current to armature coils Lu, Lv, Lw of the motor 20, based on a rotating position signal of a rotor. In this illustrative embodiment, the rotating position signal of the rotor is a signal that is obtained by estimating the rotating position of the rotor from an output signal of a Hall element (not shown).

The motor driving device 1 includes a motor driving unit 2 having an inverter circuit 2a and a pre-driver circuit 2b, and a control unit 4. Incidentally, the constitutional elements of the motor driving device 1 shown in FIG. 1 are a part of the whole device, and the motor driving device 1 may have other constitutional elements, in addition to the constitutional elements shown in FIG. 1.

In this illustrative embodiment, the motor driving device 1 is an integrated circuit device (IC) in which the entirety thereof is packaged. Incidentally, a part of the motor driving device 1 may be packaged as one integrated circuit device, or all or a part of the motor driving device 1 may be packaged together with another device to configure one integrated circuit device.

The inverter circuit 2a configures the motor driving unit 2 together with the pre-driver circuit 2b. The inverter circuit 2a outputs a driving signal to the motor 20 based on an output signal from the pre-driver circuit 2b, and energizes the armature coils Lu, Lv, Lw of the motor 20. For example, a series circuit pair (a pair of switch elements Q1, Q2, a pair of switch elements Q3, Q4 and a pair of switch elements Q5, Q6) of two switch elements provided at both ends of a DC power supply Vcc is provided for each phase (V phase, V phase and W phase) of the armature coils Lu, Lv, Lw, so that the inverter circuit 2a is configured. In each pair of the two switch elements, a connection point of the switch elements is connected with a terminal of each phase of the motor 20. Specifically, a terminal of the U phase is connected to a connection point of the switch elements Q1. Q2. A terminal of the V phase is connected to a connection point of the switch elements Q3, Q4. A terminal of the W phase is connected to a connection point of the switch elements Q5, Q6.

The pre-driver circuit 2b generates output signals for driving the inverter circuit 2a based on the control of the control unit 4, and outputs the same to the inverter circuit 2a. As the output signals, six types of signals Vuu Vul, Vvu, Vvl, Vwu, Vwl corresponding to the respective switch elements Q1 to Q6 of the inverter circuit 2a are output, for example. That is, the output signal Vim is output to the switch element Q1. The output signal Vul is output to the switch element Q2. The output signal Vvu is output to the switch element Q3. The output signal VIA is output to the switch element Q4. The output signal Vwu is output to the switch element Q5. The output signal Vwl is output to the switch element Q6. The output signals are output, so that the switch elements Q1 to Q6 corresponding to the respective output signals are turned on/off, the driving signal is output to the motor 20, and the power is thus supplied to each phase of the motor 20. When all phases are turned off, all the switch elements Q1 to Q6 are turned off.

In this illustrative embodiment, the control unit 4 receives a signal Sr indicating the number of rotations (an example of detection information of a number of rotations), a clock signal Sc (an example of command information of a target number of rotations) and a start signal Ss. Throughout the present specification and in the claims, the terms "clock signal" and "target signal" are used interchangeably to mean the same thing.)

The signal Sr indicating the number of rotations is input from the motor 20 to the control unit 4. The signal Sr indicating the number of rotations is, for example, an FG signal corresponding to the rotation of the rotor of the motor 20. That is, the signal Sr indicating the number of rotations is the information of the number of rotations indicating a detection result of the number of rotations of the motor 20. The FG signal may be a signal (FG pattern), which is generated using a coil pattern provided for a substrate of the rotor-side, or a signal (Hall FG), which is generated using an output of a Hall element provided in the motor 20. Incidentally, a rotating position detection circuit for detecting a counter electromotive force induced to each phase (U phase, V phase and W phase) of the motor 20 may be provided and the rotating position and the number of rotations of the rotor of the motor 20 may be detected based on the detected counter electromotive force. Alternatively, a sensor signal of an encoder and the like for detecting the number of rotations and rotating position of the motor may be used.

The clock signal Sc is input from an outside of the control unit 4, for example. The clock signal Sc is a signal relating to the number of rotations of the motor 20, and a frequency signal corresponding to a target rotating speed of the motor 20, for example. In other words, the clock signal Sc is command information for designating the target rotating speed of the motor 20. Incidentally, the command information of the target rotating speed is not limited to the clock signal and may be a Pulse Width Modulation (PWM) signal.

The start signal Ss is input from an outside of the control unit 4, for example. The start signal Ss is a signal for setting a driving mode performing the driving the motor 20 or a standby mode not performing the driving.

The control unit 4 is configured by a microcomputer, a digital circuit and not the like, for example. The control unit 4 outputs a pre-driving signal Sd to the pre-driver circuit 2b based on the signal Sr indicating the number of rotations, the clock signal Sc, the start signal Ss and the rotating position signal. The control unit 4 outputs the pre-driving signal Sd to control the rotation of the motor 20 so that the motor 20 is rotated with the number of rotations corresponding to the clock signal Sc. That is, the control unit 4 outputs the pre-driving signal Sd for driving the motor 20 to the motor driving unit 2, thereby controlling the rotation of the motor 20. The motor driving unit 2 outputs the driving signal to the motor 20 based on the pre-driving signal Sd, thereby driving the motor 20.

Description of Control Unit 4

Figure 2:
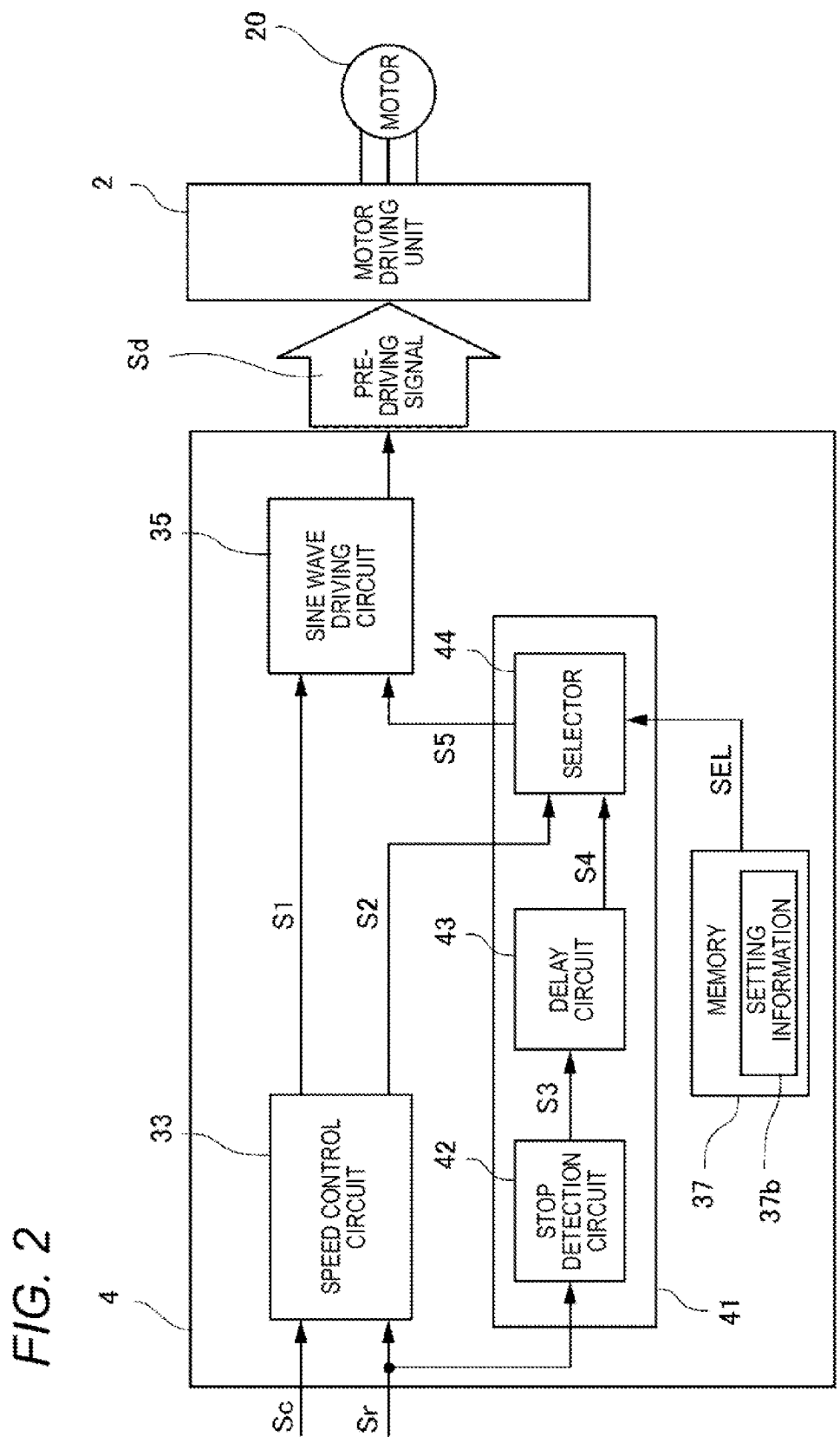
FIG. 2 is a block diagram showing a configuration of a control unit.

FIG. 2 is a block diagram showing a configuration of the control unit 4.

As shown in FIG. 2, the control unit 4 includes a speed control circuit 33, a sine wave driving circuit (an example of a driving signal generation circuit) 35, a memory (an example of a storage) 37 and a stop control circuit 41. Each circuit is a digital circuit. In FIG. 2, the transmission and reception of signals, information and the like between the respective circuits are shown in relation to generation of the pre-driving signal Sd.

The speed control circuit 33 receives the clock signal Sc and the signal Sr indicating the number of rotations. The speed control circuit 33 outputs a torque command signal (an example of speed command information) S1 relating to the number of rotations of the motor based on the clock signal Sc and the signal Sr indicating the number of rotations. Also, the speed control circuit 33 outputs a clock stop signal (an example of input stop information) S2 when the input of the clock signal Sc is stopped.

The sine wave driving circuit 35 receives the torque command signal S1 output from the speed control circuit 33. The sine wave driving circuit 35 outputs the pre-driving signal Sd corresponding to the input torque command signal S1. When a stop command signal (an example of stop command information) S5 is input from the stop control circuit 41, as described later, the sine wave driving circuit 35 outputs the pre-driving signal Sd which is based on the stop control mode, based on the stop command signal S5 and the torque command signal S1. Accordingly, the pre-driving signal Sd is output from the sine wave driving circuit 35, so that the operation of the motor driving unit 2 is controlled.

The stop control circuit 41 receives the signal Sr indicating the number of rotations and the clock stop signal S2 output from the speed control circuit 33. When the input of the clock signal Sc to the control unit 4 is stopped when the clock signal Sc is not input to the control unit 4 and when the clock signal Sc to be input to the control unit 4 becomes a Low signal corresponding to the stop of the motor 20), the stop control circuit 41 outputs the stop command signal S5, based on the clock stop signal S2 indicating the stop of the input of the clock signal and a detection result of the stop of the motor 20 based on the signal Sr indicating the number of rotations, thereby operating the control unit 4 at the stop control mode. The stop command signal S5 is output after a predetermined time elapses from a detection timing of the stop of the motor 20.

The stop control circuit 41 includes a stop detection circuit 42, a delay circuit 43 and a selector (an example of a selection circuit) 11.

The stop detection circuit 42 receives the signal Sr indicating the number of rotations. The step detection circuit 42 detects the step of the motor 20 based on the signal Sr indicating the number of rotations. When detecting the stop of the motor 20, the stop detection circuit 42 outputs a stop detection signal (an example of stop detection information) S3.

The delay circuit 43 includes a counter and the like, for example. The delay circuit 43 generates a delay signal (an example of delay information) S4 by adding a predetermined time to the detection timing of the stop of the motor 20 based on the stop detection signal S3 output from the stop detection circuit 42. The delay signal S4 is input to the selector 44.

The selector 44 receives the clock stop signal S2 and the delay signal S4. The selector 44 generates the stop command signal S5 based on the clock stop signal S2 and the delay signal S4, and outputs the generated stop command signal S5 to the sine wave driving circuit 35.

Here, the stop control circuit 41 is configured to select whether to set the stop control mode, whether to output the stop command signal S5, based on setting information 37b (setting information SEL) stored in the memory 37. The setting information SEL is input to the selector 11, and the selector 44 operates in accordance with the setting information SEL, so that the selection operation is implemented.

The memory 37 stores therein various setting values and the like used for the operation of the control unit 4. The memory 37 stores therein the various setting information 37b including the setting information SEL relating to the stop control mode.

FIG. 3 shows a relation between the setting information SEL and the stop control mode.

A relation between the setting information SEL and the stop control mode, i.e., whether the stop control mode is set to be enabled or disabled, in other words, whether to output the stop command signal S5 is set as shown in FIG. 3. That is, when the setting information SEL is '0', the stop control mode is set to be disabled and when the setting information SEL is '1', the stop control mode is set to be enabled.

For example, the memory 37 starts at the power-on and the pre-stored setting information SEL ('1' or '0') is output to the selector 44, so that the setting information SEL is set.

When the setting information SEL indicates an output of the stop command signal S5 (for example, the setting information SEL is '1'), the selector 44 operates so that the stop control mode is enabled. At this time, the selector 44 outputs the stop command signal S5 to the sine wave driving circuit 35.

On the other hand, when the setting information SEL does not indicate an output of the stop command signal S5 (for example, the setting information SEL is '0'), the selector 44 operates so that the stop control mode is disabled. At this time, the selector 44 does not output the stop command signal S5.

Description of Control Based on Stop Control Mode

As described above, in this illustrative embodiment, when the stop control mode is enabled, the stop command signal S5 is output from the stop control circuit 41 upon the stop of the motor 20, so that the pre-driving signal Sd corresponding to the stop control mode is output from the control unit 4.

Figure 4:
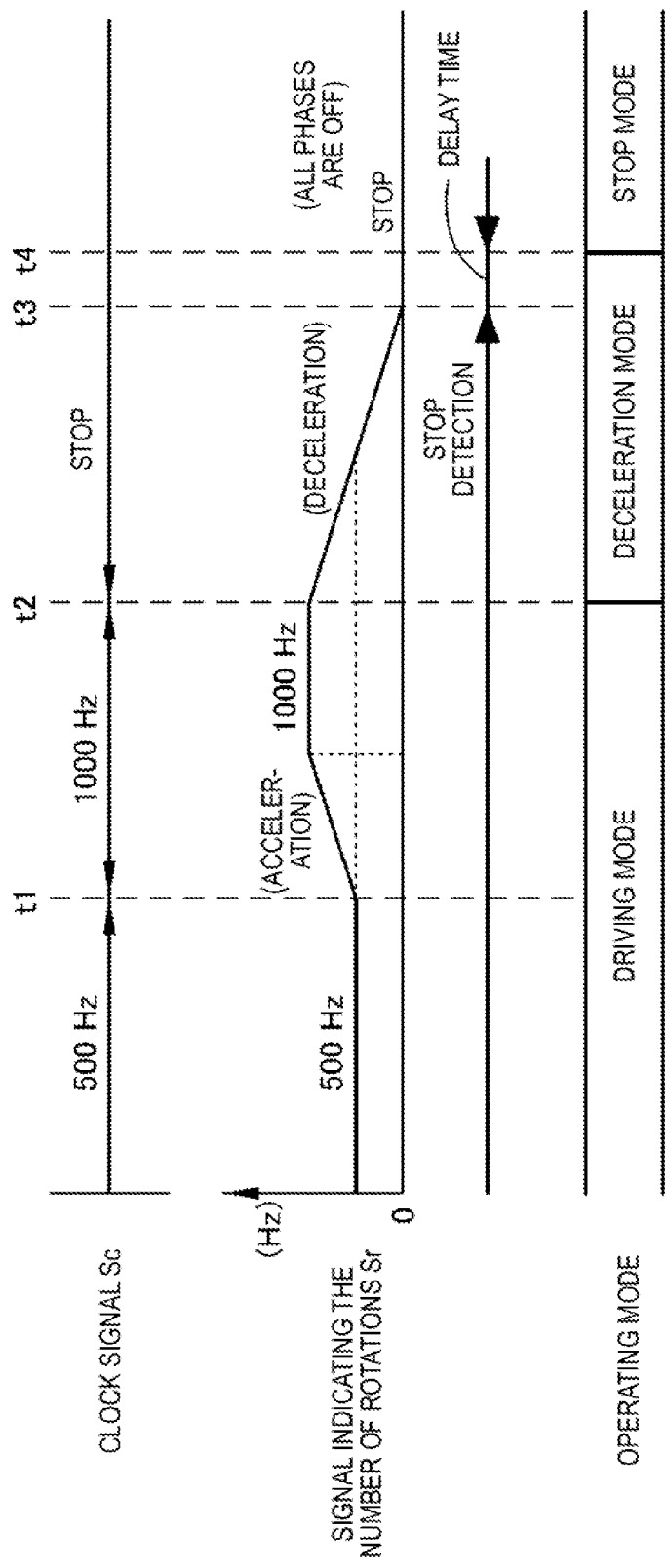
FIG. 4 is a timing, chart showing an example of an operation which is performed by the motor driving device based on the stop control mode in the illustrative embodiment.

FIG. 4 is a timing chart showing; an example of an operation that is performed by the motor driving device 1 of the illustrative embodiment based on the stop control mode.

FIG. 4 shows changes of the clock signal Sc, the signal Sr indicating the number of rotations and the operating state of the motor driving device 1 from the upper.

First, up to a time t1, the motor driving device operates at the driving mode, the clock signal Sc is 500 Hz and the signal Sr indicating the number of rotations is also 500 Hz.

From the time t1 to a time t2, when the clock signal Sc becomes 1000 Hz, the number of rotations of the motor 20 starts to increase (the motor 20 starts to accelerate) from the time t1 and the signal Sr indicating the number of rotations becomes 1000 Hz. When the signal Sr indicating the number of rotations becomes 1000 Hz, the signal Sr indicating the number of rotations is stabilized.

At the time t2, when the clock signal Sc is stopped, the operating mode is shifted from the driving mode to the deceleration mode, so that the motor 20 starts to decelerate.

At a time t3, the signal Sr indicating the number of rotations becomes a Low signal. This means that the number of rotations of the motor 20 becomes zero (however, it is unknown whether the motor 20 is actually at the stop state). At this time, the stop detection circuit 42 detects the stop based on the signal Sr indicating the number of rotations, and outputs the stop detection signal S3.

From the time t3 to a time t4, a predetermined timed is added (a delay time is provided). When the delay time elapses and it reaches the time t4, all the switch elements of the inverter circuit 2a of the motor driving unit 2 become off (all phases are off) and the operating mode of the motor driving device 1 becomes the stop mode.

Incidentally, the predetermined delay time is preferably set using a time which is calculated in advance by performing a test with an actual device. Specifically, a time is measured after the stop detection signal S3 is output based on the Low signal of the signal Sr indicating the number of rotations until the motor 20 is completely stopped, and a sufficient time until the motor 20 is completely stopped is preferably set as the delay time. For example, when it is confirmed through the test that the motor 20 is completed stopped within 1 second after the signal Sr indicating the number of rotations becomes a Low signal, longer time (for example, 3 seconds and the like) may be set as the delay time.

Figure 5:
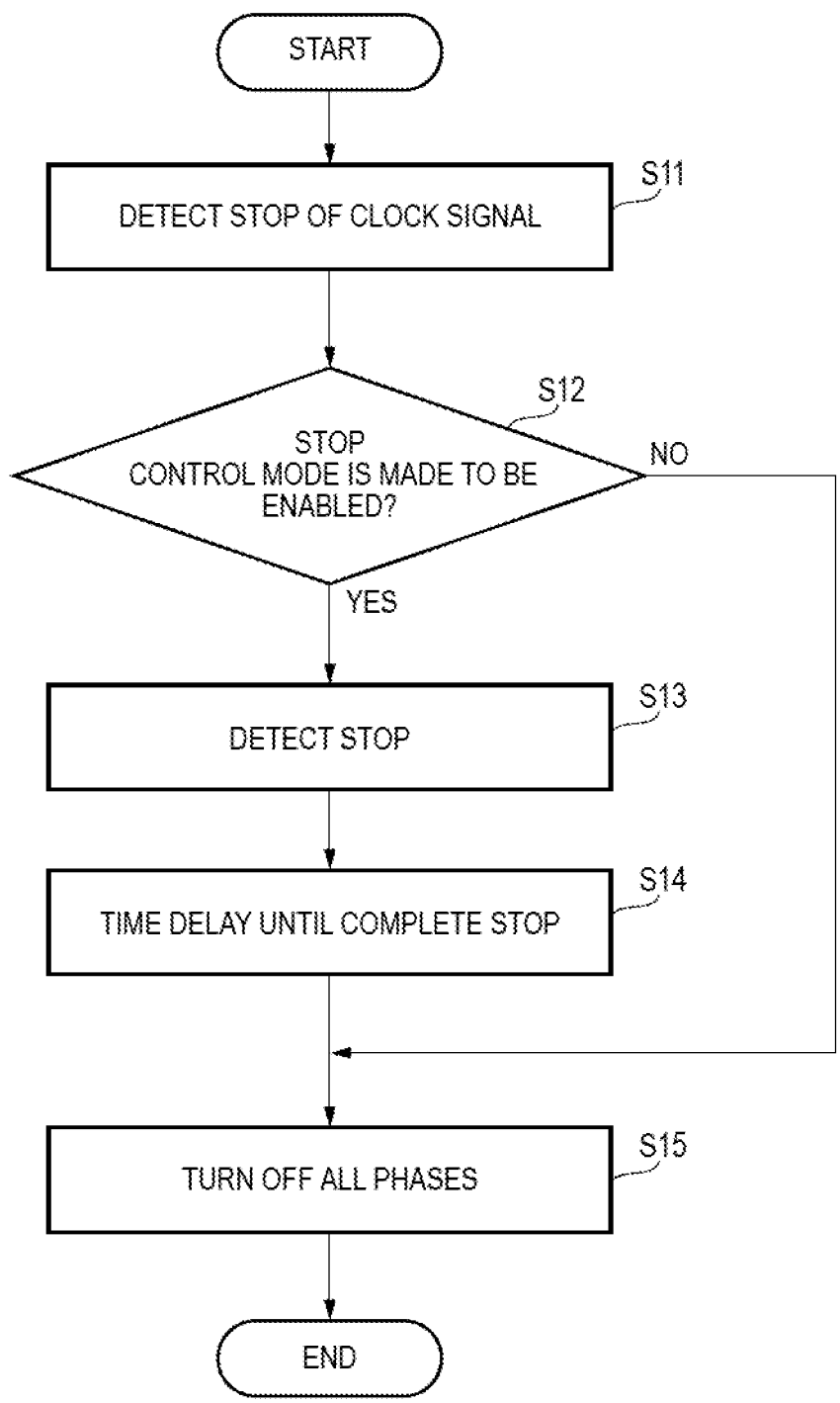
FIG. 5 is a flowchart showing control which is performed when a motor stopped in the illustrative embodiment.
Figure 6:
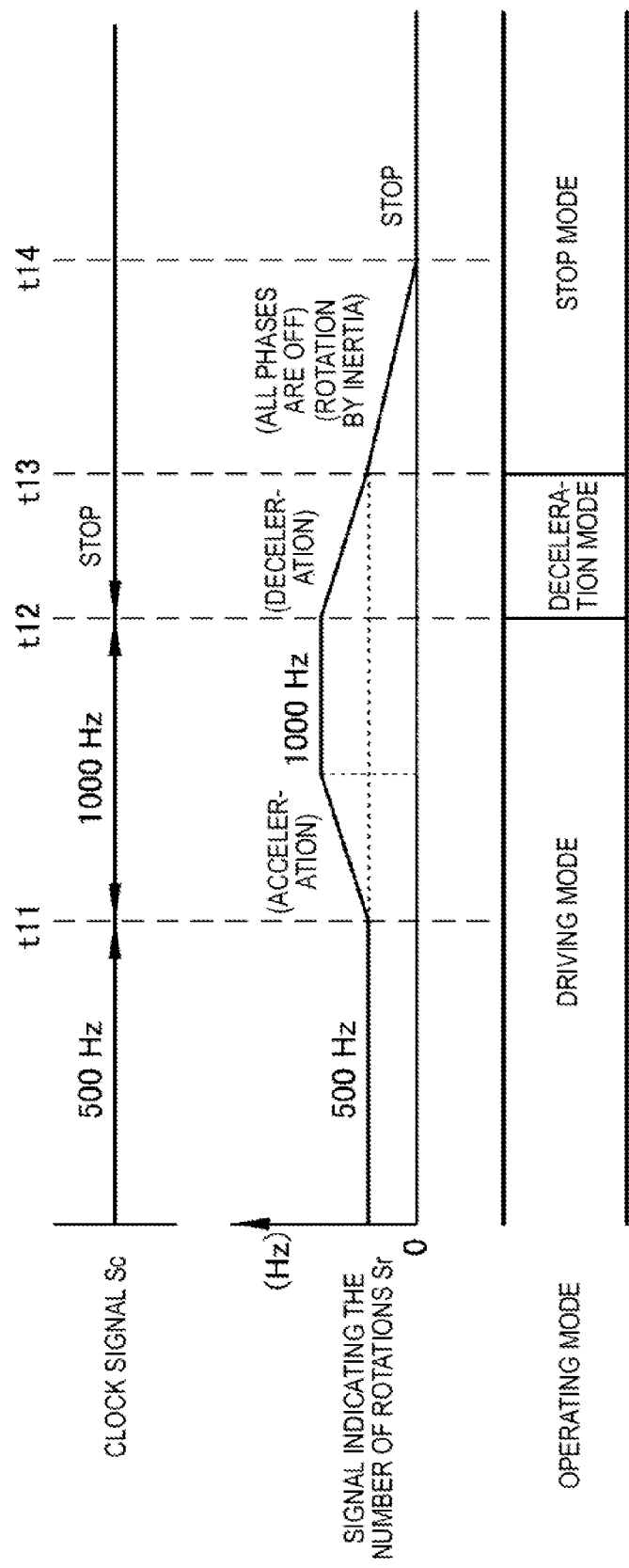
FIG. 6 shows an example of a control operation of a related-art motor driving device.

FIG. 5 is a flowchart showing control which is performed when the motor 20 is stopped in the illustrative embodiment.

As shown in FIG. 5, a sequence after the motor driving device 1 detects the stop of the clock signal Sc until the rotation of the motor 20 is stopped is as follows.

That is, in step S11, the control unit 4 detects that the clock signal Sc is stopped.

In step S12, the stop control circuit 41 determines whether to make the stop control mode enabled (whether to perform the control based on the stop control mode). When making the stop control mode enabled (performing the control) (YES), the stop control circuit 41 performs processing of step S13. When not making the stop control mode enabled (not performing the control) (NO), the control unit 4 performs processing of step S15.

When not making the stop control mode enabled, the stop command signal may be transmitted at a timing corresponding to the clock stop signal S2 from the stop control circuit 41 to the sine wave driving circuit 35 (not shown), and the sine wave driving circuit 35 may correspondingly output the pre-driving signal Sd.

When the stop control mode is enabled, in step S13, the stop detection circuit 42 detects the stop. Thereby, the stop detection signal S3 is output from the stop detection circuit 42.

In step S14, the delay circuit 43 adds the predetermined time to the stop detection timing. Thereby, the time at which the driving is off is delayed until the motor 20 is completely stopped. When the delay time elapses, the stop command signal S5 is output to the sine wave driving circuit 35 and processing of step S15 is performed.

In step S15, the control unit 4 performs control of turning off all the phases (turning off all the switch elements Q1 to Q6). Thereby, the processing upon the stop is finished.

Effects of Illustrative Embodiment

As described above, in this illustrative embodiment, when the control based on the stop control mode is performed, the stop command signal S5 is output from the stop control circuit 41, the pre-driving signal Sd corresponding to the stop control mode is output from the control unit 4, and the motor driving unit 2 operates based on the pre-driving signal Sd. Accordingly, the predetermined delay time is provided after the signal Sr indicating the number of rotations of the motor 20 becomes a Low signal until all the phases of the inverter circuit 2a become off.

When the generation timing of the stop detection signal S3 coincides with the stop timing of the rotation of the motor 20, it is not necessary to add the delay time. However, actually, in addition to when the rotation is completely stopped, when the rotation is very slow, for example, the signal Sr indicating the number of rotations becomes a Low signal, so that the stop detection signal S3 may be output. In contrast, according to this illustrative embodiment, based on the control at the stop control mode, after the signal Sr indicating the number of rotations becomes a Low signal and then at least the delay time elapses, all the phases of the inverter circuit 2a become off. Therefore, since the driving signal output to the motor 20 becomes off at the state where the rotation of the motor 20 is completely stopped, it is possible to prevent the regenerative current from flowing while the motor 20 is rotated by its inertia at the rotation stop of the motor 20. As a result, it is possible to prevent an abnormal noise from being generated while the motor 20 is rotated by its inertia at the rotation stop of the motor 20, thereby stopping the rotation of the motor 20 in silence.

Also, in this illustrative embodiment, it is possible to appropriately select whether to perform the control based on the stop control mode with the stop control mode being enabled by setting the setting information 37b stored in the memory 37, or to perform the related-art free run stop without performing the control based on the stop control mode. Therefore, it is possible to apply the motor driving device 1 to the various utilities.

Incidentally, when the stop control mode is necessarily performed at the stop of the motor 20, the setting information 37b on the output of the stop command signal S5 may not be stored in the memory 37. That is, it has only to necessarily output the stop command signal S5 from the stop control circuit 41 at the stop.

Others

The control unit is not limited to the circuit configuration as shown in FIG. 2. That is, various circuit configurations made to meet the object of the present invention can be applied.

The clock signal may be directly input to the stop control circuit, not the clock stop signal from the speed control circuit. At this time, input of a Low signal, which means stopping the input of the clock signal, may be considered instead of the input of the clock stop signal.

When driving the motor for which the control at the stop control mode is necessarily performed at the stop of the motor, for example, the setting information may not be input. In this case, the clock stop signal or clock signal may be directly input to the delay circuit and the stop command signal may be directly output from the delay circuit to the sine wave driving circuit. With this configuration, it is possible to omit the selector, thereby simplifying the circuit configuration of the motor driving device.

The setting information is not limited to the information stored in the memory. Based on the information acquired from an outside of the control unit, the output of the stop command information may be selected.

Regarding the respective constitutional elements of the motor driving device, at least a part thereof may be implemented by software, not the hardware.

The operation example (the number of rotations and the like) shown in the timing chart and the operation example shown in the flowchart are just exemplary, and the present invention is not limited to the operation examples. Another processing may be performed between the respective processing of the flowchart.

The motor which is driven by the motor driving device of this illustrative embodiment is not limited to the three-phase brushless motor. The number of the Hall elements is not limited to three. The driving method of the motor is not limited to the sine wave driving method. For example, a square wave driving method may be adopted.

In the above illustrative embodiment, a part of all of the processing may be executed by the software or a hardware circuit.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A motor driving device for controlling operation of an electric motor, said motor driving device comprising:
    a control unit configured to receive a target signal that represents target rotation speed, and a rotation speed signal that represents rotation speed of a motor, and to output a pre-driving signal for controlling driving of the motor based on the target signal and the rotation speed signal; and
    a motor driving unit that is provided with a plurality of switch elements for supplying driving signals to each phase of coils provided in the motor, the motor driving unit being configured to receive the pre-driving signal from the control unit and to drive the motor by activating the switch elements based on the pre-driving signal,
    wherein the control unit includes:
    a speed control circuit configured to output speed command information on the number of rotations of the motor based on the target signal and the rotation speed signal;
    a stop control circuit configured to detect whether an input of the target signal to the control unit is stopped based on input stop information indicating that the input of the target signal to the control unit is stopped, and, when detected that an input of the target signal to the control unit is stopped, to wait for a predetermined time to elapse from detection of stop of the motor based on the rotation speed signal to output a clock stop signal after waiting the predetermined time, the stop control circuit including a stop detection circuit configured to detect a stop of the motor based on the rotation speed signal and output stop detection information; and a delay circuit configured to add the predetermined time to a timing, at which the stop of the motor is detected, to output delay information, based on the stop detection information output from the stop detection circuit; and
    a driving signal generation circuit configured to generate the pre-driving signal based on the speed command information output from the speed control circuit, and to generate the pre-driving signal to deactivate all the switch elements when the clock stop signal is output from the stop control circuit.

2. The motor driving device according to claim 1, wherein the stop control circuit further includes a selection circuit configured to output the clock stop signal to the driving signal generation circuit based on input stop information and the delay information output from the delay circuit, in accordance with setting information on an output of the driving clock stop signal.

3. The motor driving device according to claim 2,
wherein the control unit further includes a non-volatile storage medium configured to store therein the setting information therein, and
wherein the selection circuit is configured to select whether to output the clock stop signal based on the setting information stored in the storage.

4. The motor driving device according to claim 1, wherein a part or all of the motor driving device is packaged as an integrated circuit device.

5. A control method of a motor driving device for controlling operation of an electric motor, the control method including the steps of:
receiving a target signal, via a control unit, that represents target rotation speed, and a rotation speed signal that represents a rotation speed of the electric motor;
outputting a pre-driving signal based on the target signal and the rotation speed signal; outputting a driving signal to the motor to drive the motor based on the pre-driving signal;
outputting speed command information, via a speed control circuit, on the number of rotations of the motor, based on the target signal and the rotation speed signal;
detecting, via a stop control circuit, whether an input of the rotation speed signal is stopped, based on input stop information indicating that the input of the target signal is stopped;
outputting stop detection information, when a stop of the motor is detected based on the rotation speed signal;
adding a predetermined time to a timing, via a delay circuit, at which the stop of the motor is detected, to output delay information, based on the stop detection information;
waiting for the predetermined time to elapse when it is detected that the input of the rotation speed signal is stopped;
outputting a clock stop signal, via the stop control circuit, after waiting for the predetermined time to elapse, based on a detection result of the stop of the motor based on the rotation speed signal; and
generating the driving signal, via a driving signal generation circuit, when the clock stop signal is output, to deactivate all switch elements for supplying driving signals to each phase of coils provided in the motor.

* * * * *